United States Patent [19]

Just et al.

[11] Patent Number: 4,705,885

[45] Date of Patent: * Nov. 10, 1987

[54] POLYMERIZABLE CARBAMOYLOXYALKYLDICARBOXYLIC ACID ESTERS CARRYING HYDROXYL GROUPS, A PROCESS FOR THEIR PREPARATION AND THEIR USE

[75] Inventors: Christoph Just, Niedernhausen/Taunus; Dieter Plath; Gerd Walz, both of Wiesbaden, all of Fed. Rep. of Germany

[73] Assignee: Hoechst AG, Fed. Rep. of Germany

[*] Notice: The portion of the term of this patent subsequent to Nov. 3, 2004 has been disclaimed.

[21] Appl. No.: 826,790

[22] Filed: Feb. 6, 1986

[30] Foreign Application Priority Data

Feb. 8, 1985 [DE] Fed. Rep. of Germany ....... 3504336

[51] Int. Cl.$^4$ ............................................. C07C 125/06
[52] U.S. Cl. .................................... 560/158; 560/157; 560/160; 560/165; 560/166; 526/301; 526/304
[58] Field of Search ............... 560/158, 160, 157, 165, 560/166; 526/304, 301

Primary Examiner—Paul R. Michl
Assistant Examiner—Alex H. Walker
Attorney, Agent, or Firm—Bierman & Muserlian

[57] ABSTRACT

Polymerizable carbamoyloxyalkyldicarboxylic acid esters, carrying hydroxyl groups, of the general formula (I)

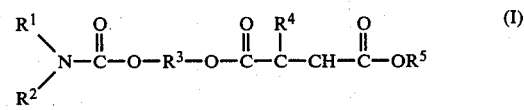

in which $R^1$ represents hydrogen or allyl or hydroxyalkyl having in each case 1 to 30 carbon atoms in the alkyl radical, $R^2$ represents alkyl or hydroxyalkyl having in each case 1 to 30 carbon atoms in the alkyl radical or the radical

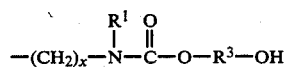

subject to the proviso that $R^1$ is hydrogen and x is an integer from 2 to 20, $R^3$ represents linear or branched alkylene having 2 to 5 carbon atoms, $R^4$ represents hydrogen or methyl and $R^5$ represents hydroxyalkyl or hydroxyaminoalkyl having in each case 2 to 20 carbon atoms in the alkyl radical or an alkyl radical of this type which also contains ester and/or ether groups, and a process for their preparation.

The esters according to the invention can be used for the preparation of copolymers.

15 Claims, No Drawings

POLYMERIZABLE CARBAMOYLOXYALKYLDICARBOXYLIC ACID ESTERS CARRYING HYDROXYL GROUPS, A PROCESS FOR THEIR PREPARATION AND THEIR USE

It is known to cure polyacrylic compounds containing hydroxyl groups by means of polyisocyanates or masked polyisocyanates.

It is also known (U.S. Pat. No. 3,479,328) to prepare polymerizable compounds containing a urethane grouping but no OH groups. These N-alkylcarbamoyloxycarboxylates can be homopolymerized or copolymerized with other suitable vinyl monomers, the carbamate group being retained. Monomers containing hydroxyl groups are not employed, however, so that the polymers formed cannot be crosslinked via OH groups by means of compounds suitable for this purpose, for example polyisocyanates and/or amine resins.

Polymerizable N,N-disubstituted carbamoyloxyalkylcarboxylic acid esters which can also be homopolymerized or copolymerized with other $\alpha,\beta$-olefinically unsaturated monomers have been described (German Pat. No. 2,422,170). However the known compounds also do not contain OH groups.

The invention relates to polymerizable carbamoyloxyalkyldicarboxylic acid esters, carrying hydroxyl groups, of the general formula (I)

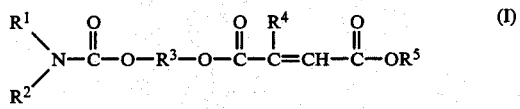

in which
$R^1$ represents hydrogen or alkyl or hydroxyalkyl having in each case 1 to 30 carbon atoms in the alkyl radical,
$R^2$ represents alkyl or hydroxyalkyl having in each case 1 to 30 C atoms in the alkyl radical or the radical

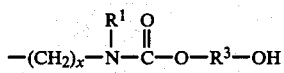

subject to the proviso that $R^1$ is hydrogen and x is an integer from 2 to 10,
$R^3$ represents a linear or branched alkylene having 2 to 5 carbon atoms,
$R^4$ represents hydrogen or methyl and
$R^5$ represents hydroxyalkyl or hydroxyaminoalkyl having in each case 2 to 20 carbon atoms in the alkyl radical or an alkyl radical of this type which also contains ester and/or ether groups.

The radical $R^5$ is preferably a hydroxyalkyl radical or a hydroxyalkyl ester radical of a branched, saturated fatty acid having 9 to 11 carbon atoms, each of which has 2 to 14 carbon atoms in the alkyl group.

As a result of the simultaneous presence of polymerizable —C=C— groups, urethane groups and hydroxyl groups, the compounds according to the invention possess a high functionality and hence a high reactivity and can thus be used as intermediates in a versatile manner. The invention also relates to a process for the preparation of the esters of the formula (I) and to their use for the preparation of copolymers.

The $\beta$-hydroxyalkyl carbamate formed in the first stage is preferably prepared in a manner known per se by reacting a cyclic alkylene carbonate and at least one primary or secondary amine, an hydroxyalkylmonoamine or an aliphatic diamine in the melt or in the presence of a solvent, and, if appropriate, under an atmosphere of a protective gas.

In the second stage, the $\beta$-hydroxyalkyl carbamate is reacted with $\alpha,\beta$-olefinically unsaturated compounds containing dicarboxylic acid units at 40° to 200° C., preferably 60° to 150° C., if appropriate in the presence of an organic solvent and/or an esterification catalyst to give a half-ester, until the reaction is virtually complete.

In the third stage, the half-ester is reacted with an epoxide compound at 0° to 150° C., preferably 40° to 130° C., and the mixture is kept at the reaction temperature until the acid number has fallen below 35, preferably below 20.

Examples of suitable cyclic alkylene carbonates are ethylene carbonate and propylene carbonate.

The following are examples of primary and secondary alkylmonoamines and hydroxyalkylmonoamines having 1 to 30, preferably 1 to 20, carbon atoms in the alkyl radical: methylamine, ethylamine, the various propylamines, butylamines and pentylamines, hexylamine, 2-methylhexylamine, 2-ethylhexylamine, n-octylamine, 6-methyl-2-heptanamine, tridecylamine, stearylamine, monoethanolamine, diethanolamine, methylethanolamine, 2-aminoethoxyethanol and aminoethylethanolamine, individually or as a mixture. N-butylamine, N-octylamine, 2-ethylhexylamine, ethanolamine and diethanolamine are preferred.

Suitable diamines have the general formula $H_2N-(CH_2)_x-NH_2$ in which x denotes an integer from 2 to 10, preferably from 2 to 6; examples are ethylenediamine, propylenediamine, tetramethylenediamine and hexamethylenediamine.

Examples of compounds containing unsaturated, polymerizable dicarboxylic acid units are $\alpha,\beta$-olefinically unsaturated dicarboxylic acids, anhydrides thereof and monoalkyl and dialkyl esters having 1 to 8, preferably 1 to 4, carbon atoms in the alkyl group, such as maleic acid, fumaric acid and itaconic acid and the methyl, ethyl, ethylhexyl, octyl or dibutyl esters thereof, but preferably maleic anhydride (MA).

Examples of suitable epoxide compounds are alkylene oxides, such as ethylene oxide, propylene oxide, hexene oxide and dodecene 1-oxide, and also glycidol, glycidyl ethers, for example butyl, p-tert.-butyl, butylhexyl and cresyl glycidyl ethers, and glycidyl esters of, for example, $\alpha$-alkylalkanemonocarboxylic acids of the empirical formula $C_{12}-C_{14}H_{22-26}O_3$, individually or as a mixture. The glycidyl radical in the glycidyl ester of the $\alpha$-alkylalkanemonocarboxylic acids and/or $\alpha,\alpha$-dialkylalkanemonocarboxylic acids has the empirical formula $C_3H_5O$. The $\alpha$-alkylalkanoic acid mixtures and $\alpha,\alpha$-dialkylalkanoic acid mixtures are monocarboxylic acids containing a $C_9$, $C_{10}$ and $C_{11}$ chain (described as glycidyl esters in the following text).

The acids are completely saturated and are very highly substituted at the carbon atom in the $\alpha$-position. Acids having two hydrogen atoms on the $\alpha$-carbon atom are not present, and only 6–7% of these acids contain one hydrogen atom. In addition, cyclic material is present (Deutsche Farbenzeitschrift as Issue 10/16th year, page 435). Preferred $\alpha$-alkylalkanemonocarboxylic acids and/or $\alpha,\alpha$-dialkylalkanemonocarboxylic acids are those have been obtained by reacting tripropylene, carbon monoxide and water and which consist almost exclusively of highly branched monocarboxylic acids having 10 carbon atoms. It is preferable to employ ethylene oxide, propylene oxide and glycidyl esters.

The reactions in the individual stages can be carried out in the melt or in a solvent. Inert solvents are suitable for this purpose, for example dimethylglycol, dimethyldiglycol, ethylglycol acetate and methoxypropyl acetate.

Suitable esterification catalysts which can be employed in the reaction of the β-hydroxyalkyl carbamates with α,β-olefinically unsaturated dicarboxylic acid units are, in particular, basic catalysts, for example zinc acetate, tin octoate, zirconium octoate, dibutyltin dilaurate, diazabicyclooctane, tertiary amines such as triethylamine, and basic heterocyclic compounds, such as 2-ethyl-4-methylimidazole and the like, preferably lithium benzoate. In general, the catalysts are added in amounts of 0.1 to 0.9, preferably 0.2 to 0.7% by weight, relative to the total mixture.

In general, the molar amounts of the starting materials to be employed are equimolar, so that the alkylene carbonate: monoamine: dicarboxylic acid unit: epoxide ratio is (1:1:1:1). Preferably, up to 1.15 mol of alkylene carbonate can be employed. In the case of volatile epoxide compounds it is also possible to effect an increase in the amount employed, which can be up to 75%. After the reaction, i.e. after the acid number has fallen below 20, the excess of the epoxide compound is distilled off under reduced pressure.

If aliphatic diamines are employed in the preparation of the β-hydroxyalkyl carbamates in the first stage, the molar ratio of alkylene carbonates to diamines is generally 2–2.3:1. the resulting bis-ester is reacted further with dicarboxylic acid units and epoxide compounds in a molar ratio of 1:1:1, the statements regarding volatile epoxide compounds being also applicable in this case.

The carbamoyloxyalkyldicarboxylic acid esters according to the invention can be used in industry in a versatile manner, for example for the preparation of copolymers which have excellent properties by virtue of their various functional groups.

In the examples which follows, T denotes parts by weight and % denotes % by weight.

EXAMPLES

The compounds, according to the invention, of the formula I were obtained in accordance with the following general directions: the cyclic alkylene carbonate was melted and 1 mol of amine component was metered in at 70° to 80° C. at a rate determined by the exothermic reaction. the mixture was then kept at the reaction temperature until the amine content had a value below 0.2 mmol/g.

1 mol of the β-hydroxyalkyl carbamate obtained was heated, with stirring in the presence of nitrogen as an inert gas. Maleic anhydride and 0.25% of triethylamine or 0.63% of lithium benzoate, calculated on the total mixture, were added at 60° C. at a rate determined by the exothermic reaction. The addition of MA was controlled at such a rate that the reaction temperature did not exceed 80° C. When the MA has been added, the mixture was kept for a further period at 80° C. until the determination of the acid numbers in an aqueous or ethanol alcoholic medium gave approximately the theoretical acid number.

The amounts indicated in the table of an epoxide compound were added to the resulting half-ester at 80° C. in the course of two hours. When the addition was complete, the mixture was kept at temperatures between 80° and 125° C., depending on the epoxide compound employed, until the acid number reached a value less than <20. Excess volatile epoxide compounds were distilled off under reduced pressure.

The table below shows the composition of the examples and their characteristic data. The new monomers according to the invention are characterized by indicating their OH number, the percentage of double bonds and the molecular weight of the various compounds. The molecular weight was determined by the method of gel permeation chromatography (cf. J. C. Moore, J. Polymer Sci., A-2 (1964) page 835). The theoretical and determined analytical values for elementary analysis are also shown.

TABLE 1

|   | A: Alkylenecarbonate | B: Amine | C: Dicarboxylic acid unit | D: Epoxide | E: molar ratio A:B:C:D | F: NH₂ content \|mmol/g\| |
|---|---|---|---|---|---|---|
| 1 | Ethylene carbonate | n-butylamine | MA | Propylene oxide | 1.05:1:1:1 | 0.14 |
| 2 | " | " | " | GE | 1:1:1:1 | 0.13 |
| 3 | " | n-octylamine | " | GE | 1.1:1:1:1 | 0.19 |
| 4 | " | 2-ethylhexylamine | " | Ethylene oxide | 1.01:1:1:1.2 | 0.19 |
| 5 | " | " | " | Propylene oxide | 1.1:1:1:1.1 | 0.1 |
| 6 | " | " | " | GE | 1.1:1:1:1 | 0.15 |
| 7 | " | ethanolamine | " | Propylene oxide | 1.05:1:1:1.4 | 0.06 |
| 8 | " | djethanolamine | " | Propylene oxide | 1.05:1:1:1.6 | 0.19 |
| 9 | " | " | " | GE | 1.1:1:1:1 | 0.17 |
| 10 | " | hexamethylenediamine | " | Propylene oxide | 2.2:1:1:1.1 | 0.1 |

|   | G: Catalyst | THEORETICAL | H: Acid number I AQUEOUS | ALCOHOLIC | I: Reaction completed up to °C. | K: Acid number II |
|---|---|---|---|---|---|---|
| 1 | 0.63% of Li benzoate | 211 | 211 | 209 | 125 | 13.1 |
| 2 | " | 217 | 242 | 227 | 80 | 6.5 |
| 3 | " | 177 | 183 | 180 | 80 | 5.2 |
| 4 | " | 177 | 193 | 183 | 125 | 5.3 |
| 5 | 0.25% triethylamine | 177 | 191 | 180 | 125 | 12.0 |
| 6 | 0.63% Li benzoate | 177 | 177 | 176 | 80 | 7.9 |
| 7 | 0.63% Li benzoate | 233 | 229 | 227 | 125 | 4.9 |
| 8 | 0.63% Li benzoate | 193 | 196 | 193 | 125 | 13.2 |
| 9 | 0.63% Li benzoate | 193 | 196 | 193 | 80 | 10.9 |
| 10 | 0.63% Li benzoate | 144 | 155 | 150 | 125 | 7.0 |

| L: OH number | | M: % of —C═C— | | N: Molecular weight | | O: Elementary analysis | | | |
|---|---|---|---|---|---|---|---|---|---|
| theor. | found | theor. | found | theor. | GPC | % C theor. | % H theor. | % N theor. | % O theor. |

TABLE 1-continued

| | | | | | | | | | |
|---|---|---|---|---|---|---|---|---|---|
| 1 | 177 | 173 | 7.57 | 6.5 | 317 | 358 | 52.5(53.0) | 7.2(7.3) | 4.0(4.4) | 35.5(35.3) |
| 2 | 112 | 130 | 4.76 | 4.5 | 504 | 552 | 58.8(59.5) | 8.3(8.5) | 3.1(2.8) | 30.9(29.3) |
| 3 | 100 | 110 | 4.29 | 4.2 | 562 | 586 | 60.4(62.1) | 8.8(9.1) | 2.5(2.5) | 26.3(26.4) |
| 4 | 157 | 163 | 6.69 | 6.5 | 359 | 444 | 56.5(56.8) | 8.3(8.1) | 4.2(3.9) | 31.6(31.2) |
| 5 | 150 | 151 | 6.43 | 5.9 | 375 | 378 | 57.3(57.9) | 8.2(8.3) | 4.0(3.8) | 29.8(30.0) |
| 6 | 100 | 117 | 4.29 | 4.3 | 562 | 560 | 61.8(62.1) | 9.1(9.1) | 3.0(2.5) | 26.6(26.4) |
| 7 | 367 | 342 | 7.87 | 7.4 | 305 | 349 | 47.6(47.3) | 6.3(6.2) | 4.7(4.6) | 41.5(42.0) |
| 8 | 482 | 435 | 6.88 | 6.0 | 349 | 464 | 48.4(48.1) | 7.0(6.6) | 4.0(4.0) | 42.7(41.3) |
| 9 | 314 | 316 | 4.48 | 4.2 | 536 | 584 | 55.9(55.9) | 7.8(7.98) | 2.7(2.61) | 33.2(33.5) |
| 10 | 250 | 212 | | | | | | | | |

GE = glycidyl ester

We claim:

1. A polymerizable carbamoyloxyalkyldicarboxylic acid ester, carrying hydroxyl groups, of the formula (I)

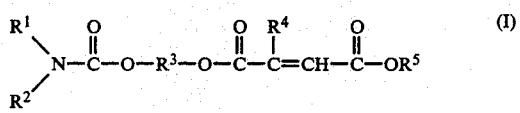

in which $R^1$ represents hydrogen or alkyl or hydroxyalkyl having in each case 1 to 30 carbon atoms in the alkyl radical, $R^2$ denotes alkyl or hydroxyalkyl having in each case 1 to 30 carbon atoms in the alkyl radical, or the radical

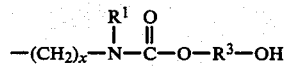

subject to the proviso that $R^1$ is hydrogen and x is an integer from 2 to 10, $R^3$ represents linear or branched alkylene having 2 to 5 carbon atoms, $R^4$ represents hydrogen or methyl and $R^5$ represents hydroxyalkyl or hydroxyaminoalkyl having in each case 2 to 20 carbon atoms in the alkyl radical or an alkyl radical of this type which also contains ester or ether groups or both.

2. A polymerisable ester as claimed in claim 1, wherein, in the formula (I), $R^1$ is hydrogen or alkyl or hydroxyalkyl having in each case 2 to 20 carbon atoms in the alkyl radical, $R^2$ is alkyl or hydroxyalkyl having in each case 2-20 carbon atoms in the alkyl radical, or the radical

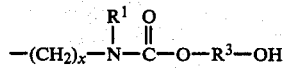

subjected to the proviso that $R^1$ is hydrogen and x denotes an integer from 2 to 6, $R^3$ is alkylene having up to 3 carbon atoms, $R^4$ is hydrogen and $R^5$ is a hydroxyalkyl radical having 2 to 14 carbon atoms in the alkyl radical or a hydroxyalkyl ester radical of a branched, saturated fatty acid having 9 to 11 carbon atoms and having 2 to 14 carbon atoms in the alkyl radical.

3. A process for the preparation of polymerizable carbamoyloxyalkyldicarboxylic acid esters, carrying hydroxyl groups, of the formula (I) which comprises (A) in the first stage reacting an alkylene carbonate at 0° to 150° C. with a primary or secondary alkylamine or hydroxyalkylmonoamine having 1 to 30 carbon atoms in the alkyl radical or an aliphatic diamine with 2 to 20 carbon atoms in the alkylene radical, (B) in the second stage, acylating the resulting β-hydroxyalkyl carbamate at 40°-200° C. with α,β-olefinically unsaturated dicarboxylic acid units having 4 to 5 carbon atoms, alone or in the presence of an esterification catalyst or organic solvents or both, and (C) in the third stage reacting the reaction product at 0° to 150° C. with an epoxide compound until an acid number <35 has been reached.

4. Process as claimed in claim 3, wherein the reaction in the third stage (C) is carried out at 40° to 130° C. until an acid number <20 has been reached.

5. Process as claimed in claim 3, wherein the cyclic alkylene carbonate:monoamine:dicarboxylic acid unit: epoxide molar ratio is (1–1.15):1:1:(1–1.75).

6. Process as claimed in claim 3, wherein the cyclic alkylene carbonate: diamine: dicarboxylic acid unit: epoxide molar ratio is (2–2.3):1:1:(1–1.75).

7. Process as claimed in claim 3 wherein a polymerizable carbamoyloxyalkyldicarboxylic acid ester of the formula (I) has been prepared in which $R^1$ is hydrogen or alkyl or hydroxyalkyl having in each case 2 to 20 carbon atoms in the alkyl radical, $R^2$ is alkyl or hydroxyalkyl having in each case 2-20 carbon atoms in the alkyl radical, or the radical

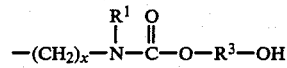

subject to the proviso that $R^1$ is hydrogen and x denotes an integer from 2 to 6, $R^3$ is alkylene having up to 3 carbon atoms, $R^4$ is hydrogen and $R^5$ is a hydroxyalkyl radical having 2 to 14 carbon atoms in the alkyl radical or a hydroxyalkyl ester radical of a branched, saturated fatty acid having 9 to 11 carbon atoms and having 2 to 14 carbon atoms in the alkyl radical.

8. Process as claimed in claim 3 wherein ethylene carbonate or propylene carbonate has been reacted on the first stage.

9. Process as claimed in claim 3 wherein N-butylamine, N-octylamine, 2-ethylhexylamine, ethanolamine, diethanolamine or a diamine with 2 to 6 carbon atoms in the alkylene radical has been reacted in the first stage.

10. Process as claimed in claim 9 wherein the diamine is ethylenediamine, propylendiamine, tetramethylenediamine or hexamethylenediamine.

11. Process as claimed in claim 3 wherein maleic anhydride has been reacted as α,β-olefinically unsaturated dicarboxylic acid unit.

12. Process as claimed in claim 3 wherein the epoxide compound is an alkylene oxide, a glycidyl ether or a glycidyl ester.

13. Process as claimed in claim 12 wherein ethylene oxide, propylene oxide or glycidyl ester of α-alkylalkanmonocarboxylic acids, α,α-dialkylalkanmonocarboxylic acid or both are reacted.

14. Process as claimed in claim 3 wherein as esterification catalysts zinc acetate, tin octoate, dibutyltin dilauraate, diazabicyclooctane, lithium benzoate, triethylamine or 2-ethyl-4-methyl imidazole in amounts of 0.1 to 0.9% by weight, relative to the total mixture are employed.

15. Copolymers obtained from the polymerizable carbamoyloxyalkyldicarboxylic acid esters, carrying hydroxyl groups, according to claim 1.

* * * * *